(12) United States Patent
Wang et al.

(10) Patent No.: US 7,321,475 B2
(45) Date of Patent: *Jan. 22, 2008

(54) IMAGE PICK-UP LENS SYSTEM

(75) Inventors: Zhuo Wang, Beijing (CN); Min-Qiang Wang, Beijing (CN); Ying-Bai Yan, Beijing (CN); Guo-Fan Jin, Beijing (CN); Ji-Yong Zeng, Beijing (CN)

(73) Assignees: Tsing Hua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 48 days.

This patent is subject to a terminal disclaimer.

(21) Appl. No.: 10/954,726

(22) Filed: Sep. 30, 2004

(65) Prior Publication Data

US 2005/0254147 A1  Nov. 17, 2005

(30) Foreign Application Priority Data

May 15, 2004  (CN) .................. 2004 1 0027254

(51) Int. Cl.
*G02B 9/04* (2006.01)
*G02B 13/18* (2006.01)

(52) U.S. Cl. .................. 359/793; 359/717; 359/738

(58) Field of Classification Search ........ 359/793–795, 359/738–740
See application file for complete search history.

(56) References Cited

U.S. PATENT DOCUMENTS

| 5,940,219 | A | 8/1999 | Yamada ............... 359/642 |
|---|---|---|---|
| 6,104,545 | A * | 8/2000 | Tsuchida ............. 359/654 |
| 6,297,915 | B1 | 10/2001 | Kaneko et al. ........ 359/718 |
| 6,449,105 | B1 | 9/2002 | Dou ..................... 359/793 |
| 6,885,508 | B2 * | 4/2005 | Yamaguchi et al. ..... 359/717 |
| 6,970,306 | B2 * | 11/2005 | Matsuo ................ 359/716 |
| 7,027,234 | B2 * | 4/2006 | Kim et al. ............ 359/717 |
| 7,038,861 | B2 * | 5/2006 | Ninomiya et al. ...... 359/719 |
| 7,075,728 | B2 * | 7/2006 | Yamaguchi et al. ..... 359/676 |
| 7,196,855 | B2 * | 3/2007 | Yamaguchi ............ 359/785 |
| 7,196,856 | B2 * | 3/2007 | Nakamura ............. 359/785 |
| 2003/0117723 | A1 * | 6/2003 | Shinohara ............ 359/794 |
| 2003/0197953 | A1 * | 10/2003 | Yamaguchi et al. ..... 359/717 |
| 2004/0036983 | A1 | 2/2004 | Ninomiya et al. ...... 359/719 |
| 2005/0280904 | A1 * | 12/2005 | Wang et al. .......... 359/717 |

FOREIGN PATENT DOCUMENTS

| CN | 1461959 | 12/2003 |
| EP | 1271215 A1 | 1/2003 |
| EP | 1357414 A1 | 10/2003 |

* cited by examiner

*Primary Examiner*—Jordan M. Schwartz
(74) *Attorney, Agent, or Firm*—Jeffrey T. Knapp

(57) ABSTRACT

An image pick-up lens system includes an aperture stop (10), a biconvex first lens (20), and a meniscus-shaped second lens (30) having a concave surface on a side of an object. The aperture stop, the first lens and the second lens are aligned in that order from the object side to an image side. Each of the lenses has at least one aspheric surface, and the following conditions are satisfied: (1) $0.5<f1/f<0.9$, and (2) $1<T/f<1.62$, wherein f1 is a focal length of the first lens, f is a focal length of the system, and T is a length from the aperture stop to an image pick-up surface of the image side.

6 Claims, 16 Drawing Sheets

IMAGE PICK-UP LENS SYSTEM

TECHNICAL FIELD

The present invention relates to an image pick-up lens system which projects an image of an object onto an image pick-up surface, the image pick-up lens system being suitable for use in products such as camera modules.

BACKGROUND

In recent years, camera modules for taking photos have begun to be incorporated in mobile terminals such as mobile phones and lap-top computers. Downsizing the camera modules is a prerequisite for enhancing the portability of these apparatuses. The camera module operates with an image pickup device such as a CCD (Charged Coupled Device) or a CMOS (Complementary Metal Oxide Semiconductor). Recently, a pixel having the size of approximately a few micrometers has become commercially feasible, and an image pickup device with high resolution and a compact size can now be commercialized. This is accelerating the demand for downsizing of image pick-up lens systems so that they are able to be suitably used with miniaturized image pick-up devices. It is also increasing expectations of cost reductions in image pick-up lens systems, commensurate with the lower costs enjoyed by modern image pickup devices. All in all, an image pick-up lens system needs to satisfy the oft-conflicting requirements of compactness, low cost, and excellent optical performance.

Compactness means in particular that a length from a lens edge of the lens system to an image pick-up surface should be as short as possible.

Low cost means in particular that the lens system should include as few lenses as possible; and that the lenses should be able to be formed from a resin or a plastic and be easily assembled.

Excellent optical performance can be classified into the following four main requirements:

First, a high brightness requirement, which means that the lens system should have a small F number (FNo.) Generally, the FNo. should be 2.8 or less.

Second, a wide angle requirement, which means that half of the field of view of the lens system should be 30° or more.

Third, a uniform illumination on the image surface requirement, which means that the lens system has few eclipses and/or narrows down an angle of incidence onto an image pick-up device.

Fourth, a high resolution requirement, which means that the lens system should appropriately correct fundamental aberrations such as spherical aberration, coma aberration, curvature of field, astigmatism, distortion, and chromatic aberration.

In a lens system which satisfies the low cost requirement, a single lens made from a resin or a plastic is desired. Typical such lens systems can be found in U.S. Pat. No. 6,297,915B1 and EP Pat. No. 1271215A2. However, even if the lens has two aspheric surfaces, it is difficult to achieve excellent optical performance, especially if a wide angle such as 70° is desired. Thus, the single lens system can generally only be used in a low-resolution image pick-up device such as a CMOS. In addition, a thick lens is generally used for correcting aberrations. Thus, a ratio of a total length of the lens system to a focal length of the lens (L/f) is about 2. In other words, it is difficult to make the lens system compact.

In a lens system which satisfies the excellent optical performance requirement, three lenses are desired. A typical such lens system can be found in U.S. Pat. No. 5,940,219. However, the ratio of a total length of the lens system to a total focal length of the three lenses (L/f) is about 2. It is difficult to make the lens system compact. In addition, the plurality of lenses increases costs.

In order to satisfy all the requirements of compactness, low cost and excellent optical performance, it is commonly believed that a two-lens system is desirable.

A well-known two-lens system is the retro-focus type lens system. A typical such lens system can be found in U.S. Pat. No. 6,449,105B1. The lens system comprises, from an object side to an image side, a first meniscus lens having negative refracting power and a convex surface on the object side, a stop, and a second meniscus lens having positive refracting power and a convex surface on the image side. The lens system helps correct wide angle aberrations. However, a shutter is positioned between the second lens and the image side, which adds to the distance between the second lens and the image side. Thus, the compactness of the lens system is limited.

U.S. Patent Publication No. 2004/0036983 discloses an image pick-up lens which overcomes the above described problems. As represented in FIG. 30 hereof, the image pick-up lens comprises, from an object side to an image side: an aperture stop 1; a biconvex positive lens 2; and a meniscus lens 3 having a concave surface on the object side. When each of the lenses 2, 3 has at least one aspheric surface, the image pick-up lens satisfies the following conditions: $0.3 < f1/f < 0.9$ and $T/f < 2.4$. In these expressions, "f" is an overall focal length of the lens system, "f1" is a focal length of the positive lens 2, and "T" is a length from the aperture stop 1 to an image pick-up surface 5.

However, the ratio of the total length of the lens system to the total focal length of the lenses 2, 3 (L/f) is generally about 2. The smallest ratio obtainable is 1.7, which still constitutes a limitation on the compactness of the lens system. In addition, it is difficult to correct lateral chromatic aberration effectively, and thus the optical performance of the lens system is limited.

Therefore, a low-cost image pick-up lens system which can properly correct aberrations and has a compact configuration is desired.

SUMMARY OF THE INVENTION

Accordingly, an object of the present invention is to provide an image pick-up lens system which has a relatively short total length.

Another object of the present invention is to provide an image pick-up lens system which can optimally correct fundamental aberrations.

To achieve the above-described objects, an image pick-up lens system in accordance with the present invention comprises an aperture stop, a biconvex first lens, and a meniscus-shaped second lens having a concave surface on a side of an object. The aperture stop, the first lens and the second lens are aligned in that order from the object side to an image side. Each of the lenses has at least one aspheric surface. According to a first aspect, the following conditions are satisfied:

$$0.5 < f1/f < 0.9, \text{ and} \tag{1}$$

$$1 < T/f < 1.62, \tag{2}$$

wherein, f1 is a focal length of the first lens, f is a focal length of the system, and T is a length from the aperture stop to an image pick-up surface of the image side.

According to a second aspect, preferably, both a first surface on the object side and a second surface on the image side of the first lens are aspheric, and the following conditions are satisfied:

$$0.2<R2/R1<1, \text{ and} \quad (3)$$

$$1.2<d/R2<2.1, \quad (4)$$

wherein, R1 is an absolute value of a radius of curvature of the first surface, R2 is an absolute value of a radius of curvature of a second surface, and d is a thickness of the first lens.

Further, to correct field curvature, each of the first and second lenses is aspheric on both surfaces thereof, and the following condition is satisfied:

$$0.5<(1/R3)/(1/R1+1/R2+1/R4)<1, \quad (5)$$

wherein, R3 is an absolute value of a radius of curvature of a third surface of the second lens on the object side, and R4 is an absolute value of a radius of curvature of a fourth surface of the second lens on the image side.

Further still, the two lenses are made from a resin or a plastic. To correct chromatic aberration, the Abbe constant v1 of the first lens and the Abbe constant v2 of the second lens preferably satisfy the following condition:

$$v1-v2>20. \quad (6)$$

Because the first lens is positioned adjacent the aperture stop and has at least one aspheric surface, the image pick-up lens system can appropriately correct spherical and coma aberrations. In addition, because the second lens is positioned away from the aperture stop and has at least one aspheric surface, different chief rays of different field angle can have very different corresponding projection heights at the second lens. Therefore the system can appropriately correct astigmatism, field curvature and distortion, all of which are related to the field angle. Furthermore, the fourth surface of the second lens has a gradually varying refraction from a central portion thereof near an optical axis of the system to a peripheral edge portion thereof. Thus, a central portion of the second lens diverges light rays and a peripheral edge portion of the second lens converges light rays, so that the meridional/sagittal sections easily coincide. For all the above reasons, the optical image performance in wide angles of the system is enhanced. Moreover, because the first and second lenses can be made from a resin or a plastic, the system is relatively easy and inexpensive to mass manufacture.

Other objects, advantages and novel features of the present invention will become more apparent from the following detailed description when taken in conjunction with the accompanying drawings, in which:

DETAILED DESCRIPTION OF EMBODIMENTS OF THE INVENTION

Figure 1:
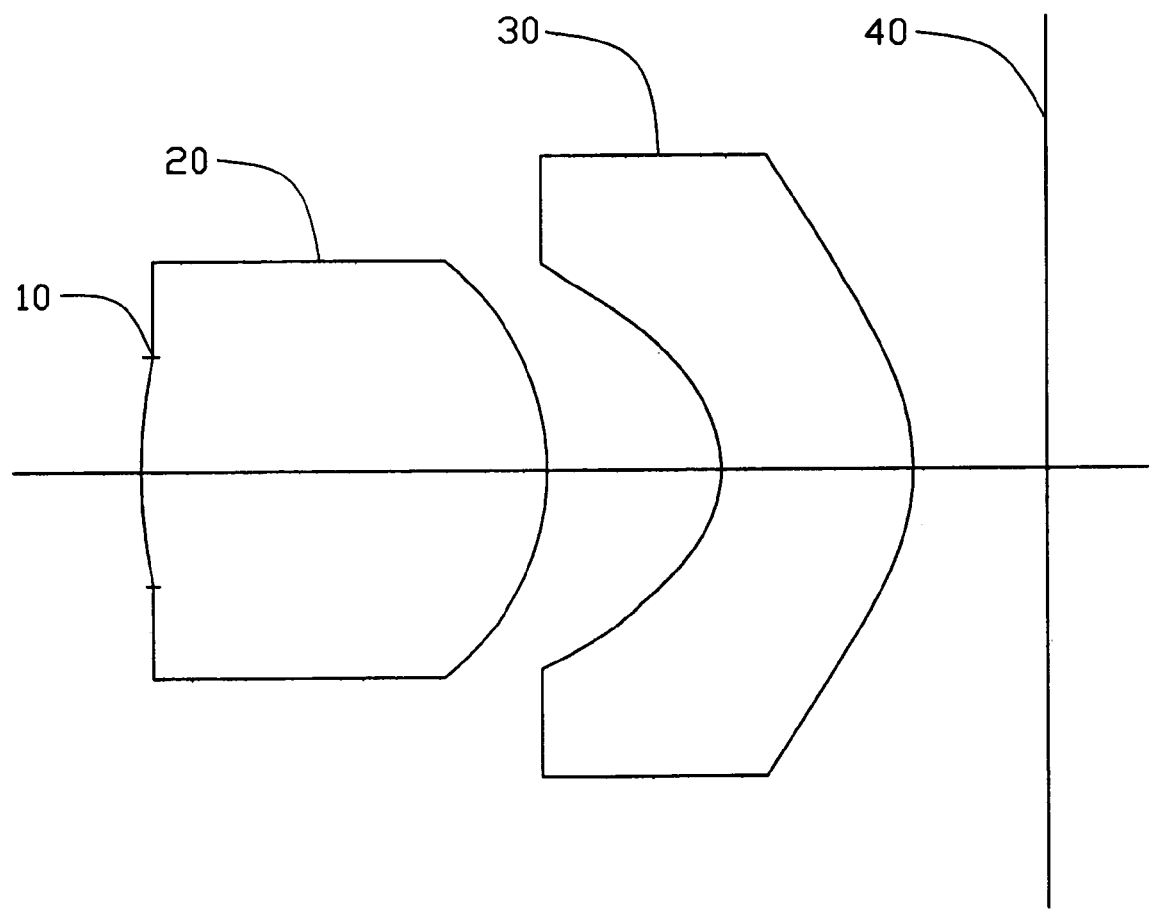
FIG. 1 is a schematic view of an image pick-up lens system in accordance with the present invention.
Figure 2A:
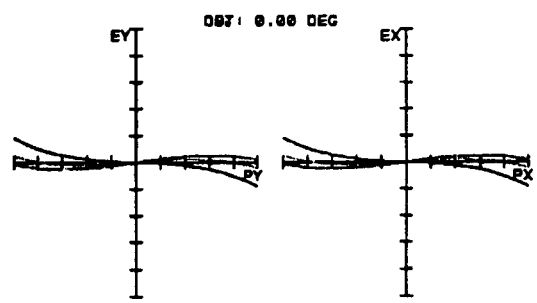
FIGS. 2-5 are graphs respectively showing transverse ray fan plots, field curvature and distortion, longitudinal spherical aberration, and lateral chromatic aberration curves for an image pick-up lens system in accordance with a first exemplary embodiment of the present invention.
Figure 2B:
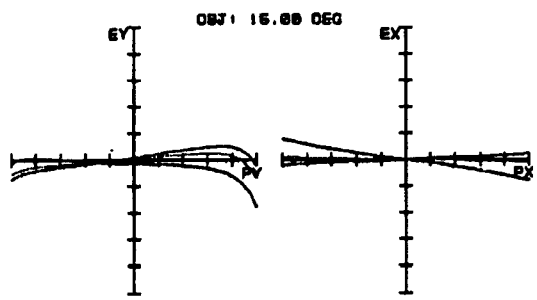
Figure 2C:
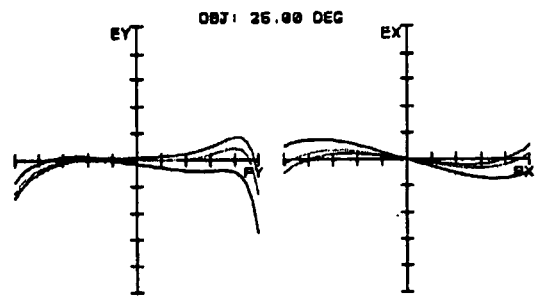
Figure 2D:
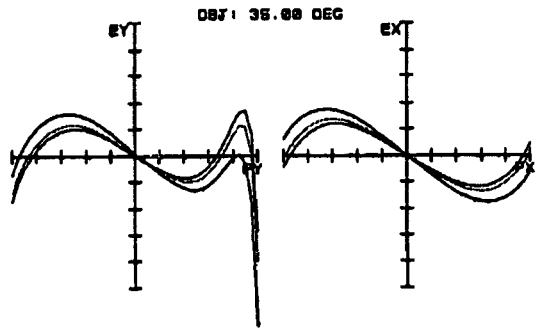
Figure 3A:
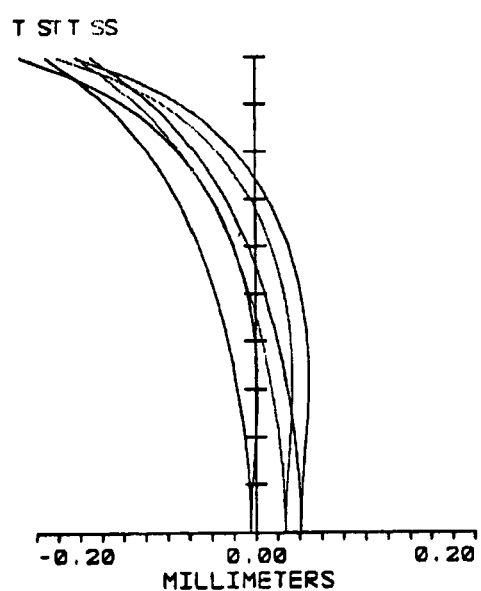
Figure 3B:
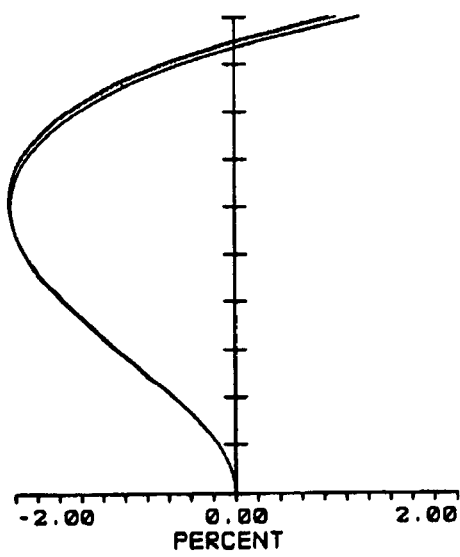
Figure 4:
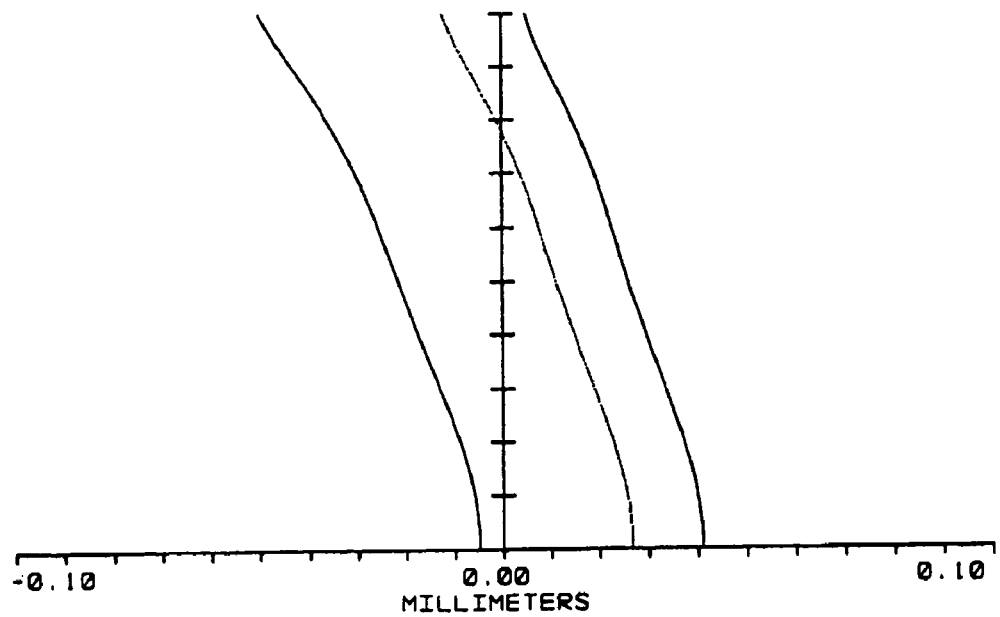
Figure 5:
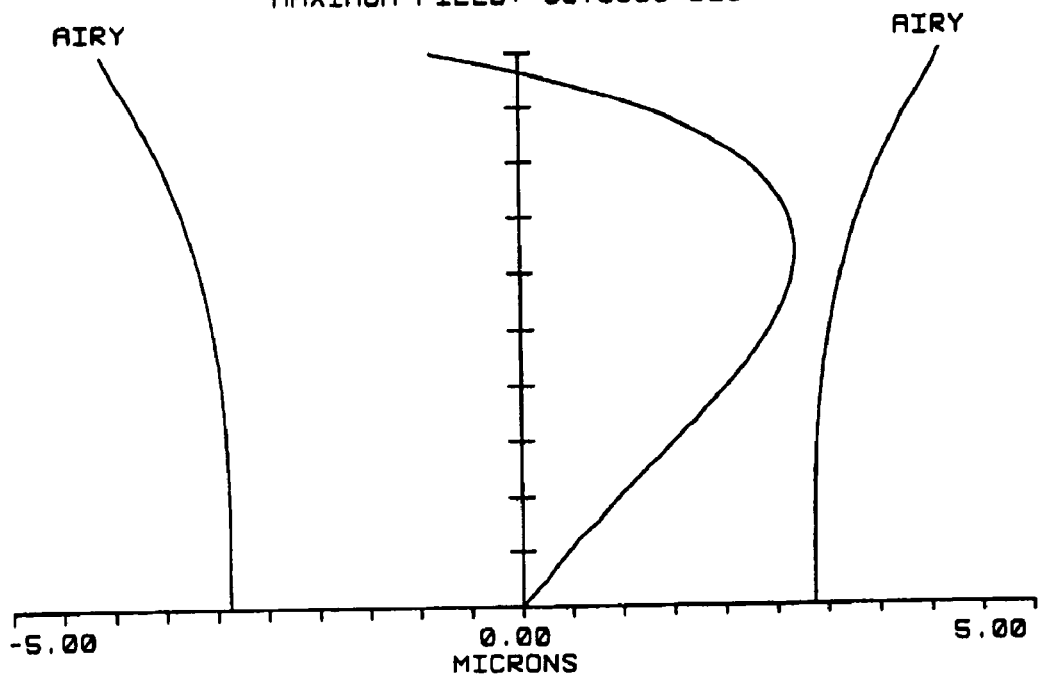
Figure 6A:
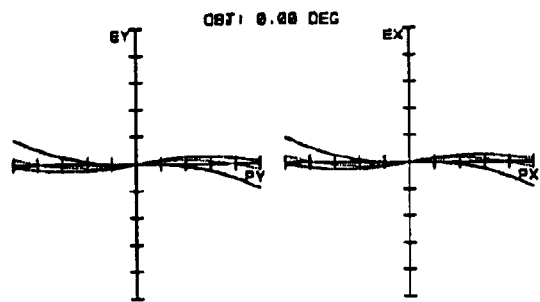
FIGS. 6-9 are graphs respectively showing transverse ray fan plots, field curvature and distortion, longitudinal spherical aberration, and lateral chromatic aberration curves for an image pick-up lens system in accordance with a second exemplary embodiment of the present invention.
Figure 6B:
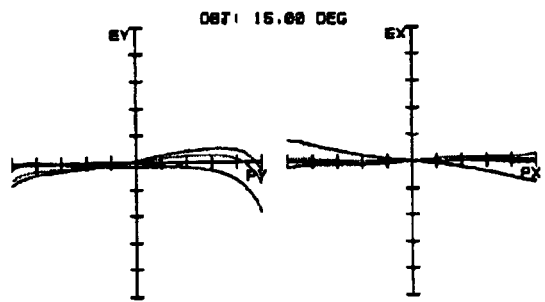
Figure 6C:
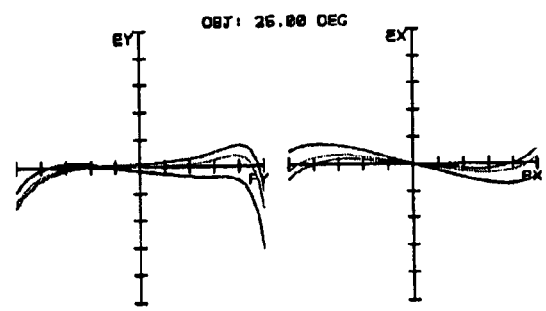
Figure 6D:
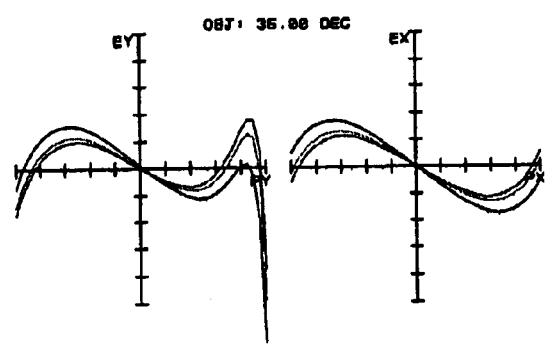
Figure 7A:
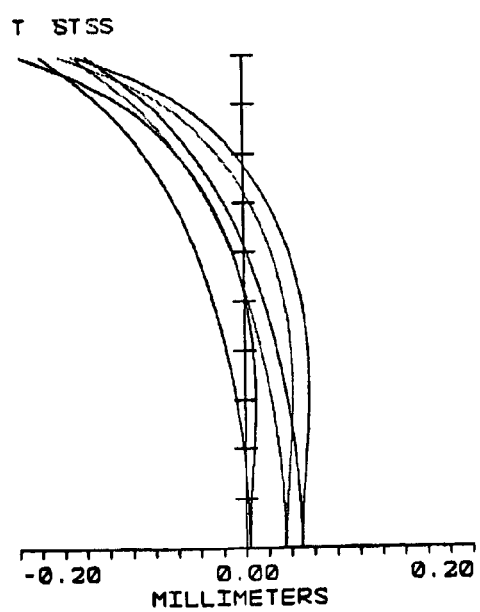
Figure 7B:
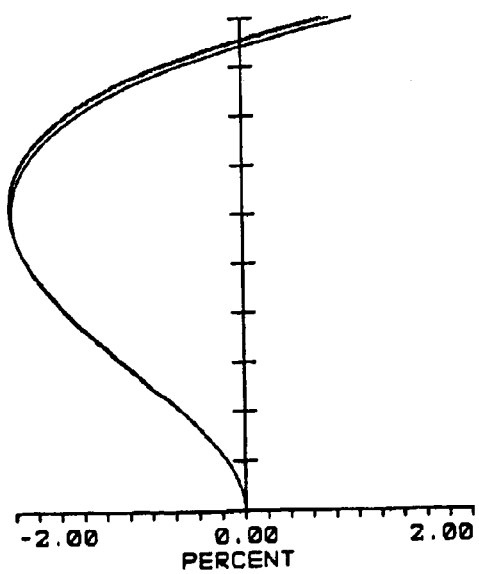
Figure 8:
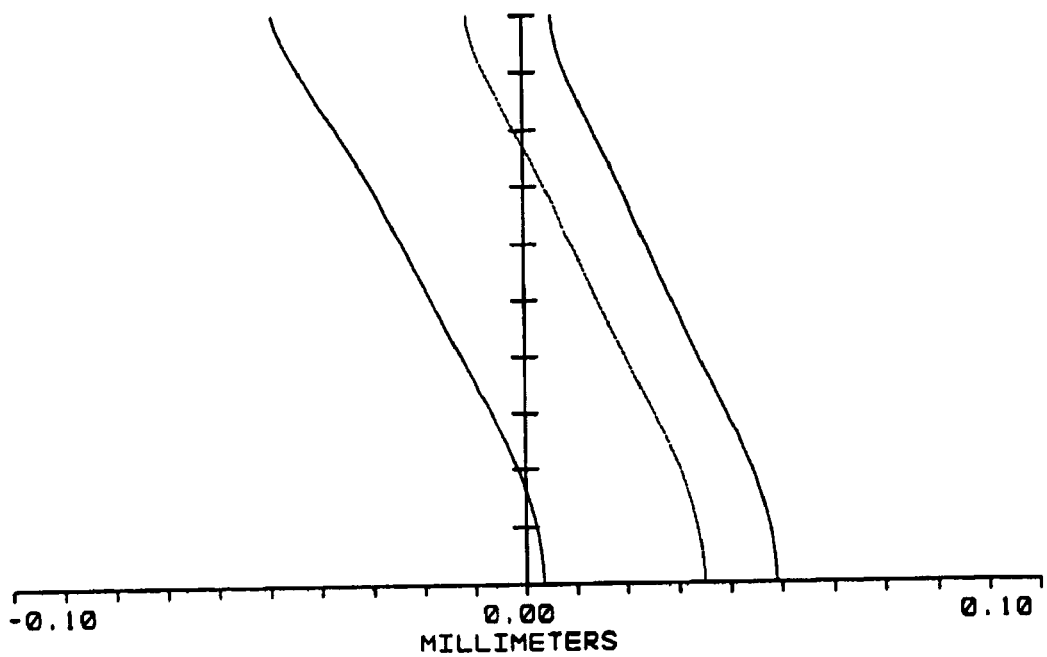
Figure 9:
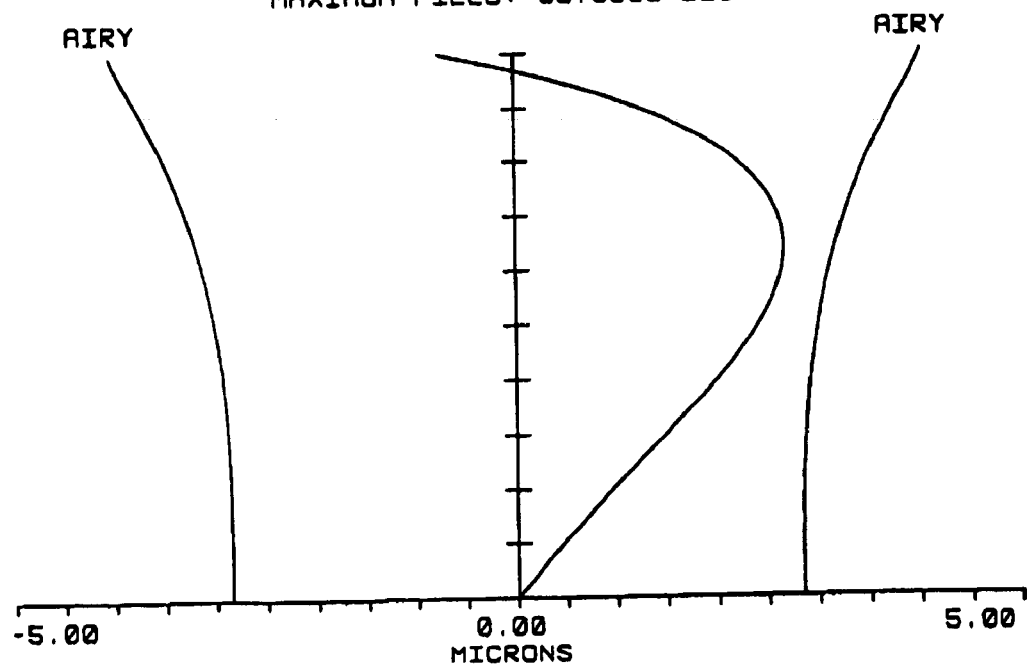
Figure 10A:
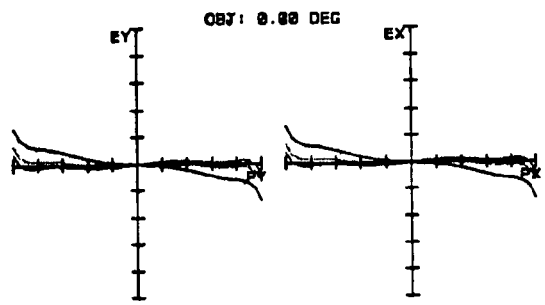
FIGS. 10-13 are graphs respectively showing transverse ray fan plots, field curvature and distortion, longitudinal spherical aberration, and lateral chromatic aberration curves for an image pick-up lens system in accordance with a third exemplary embodiment of the present invention.
Figure 10B:
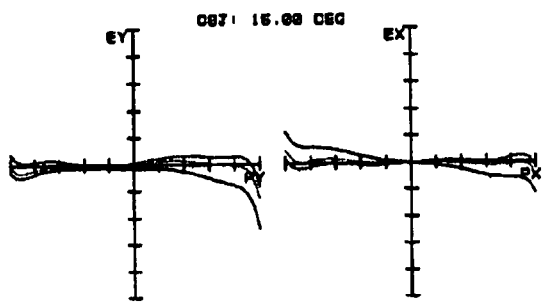
Figure 10C:
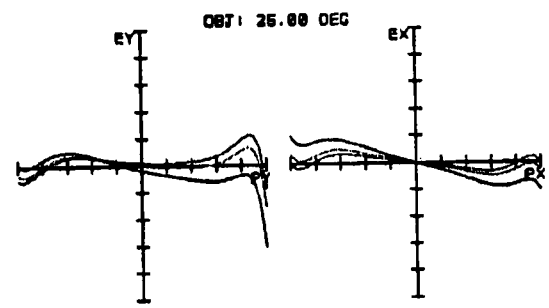
Figure 10D:
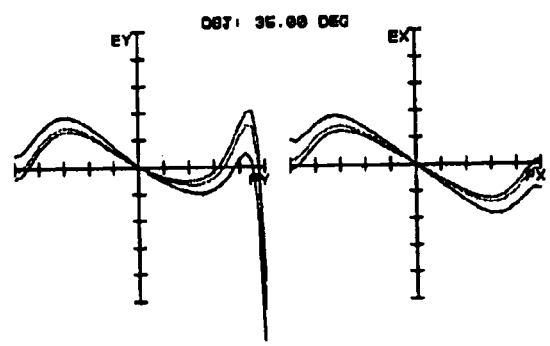
Figure 11A:
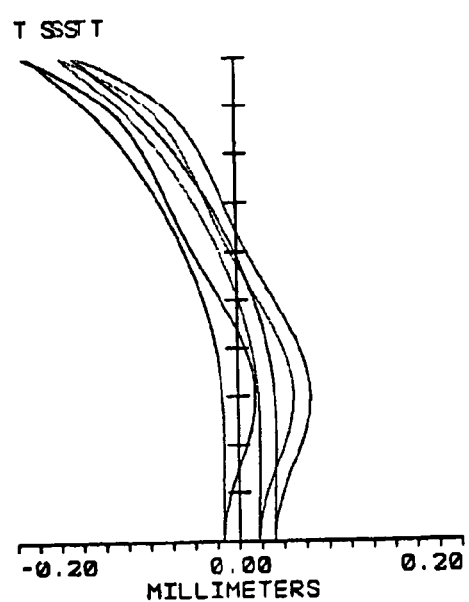
Figure 11B:
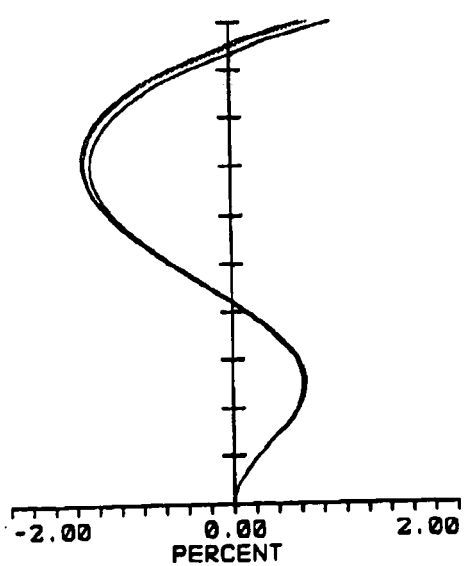
Figure 12:
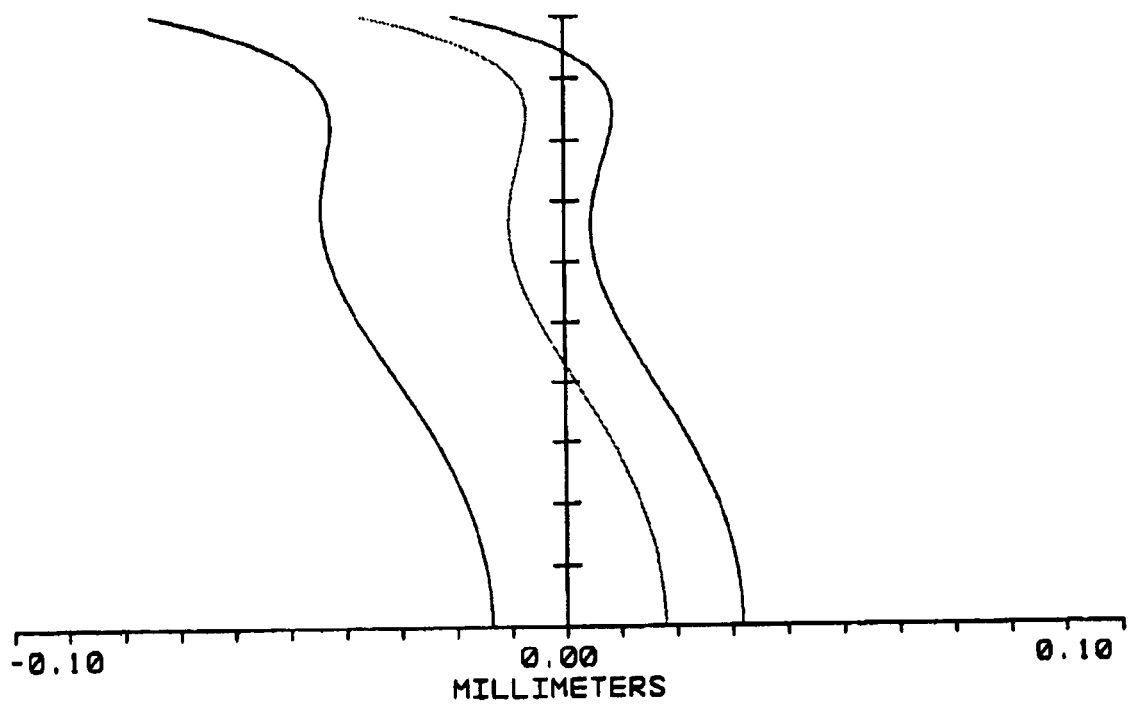
Figure 13:
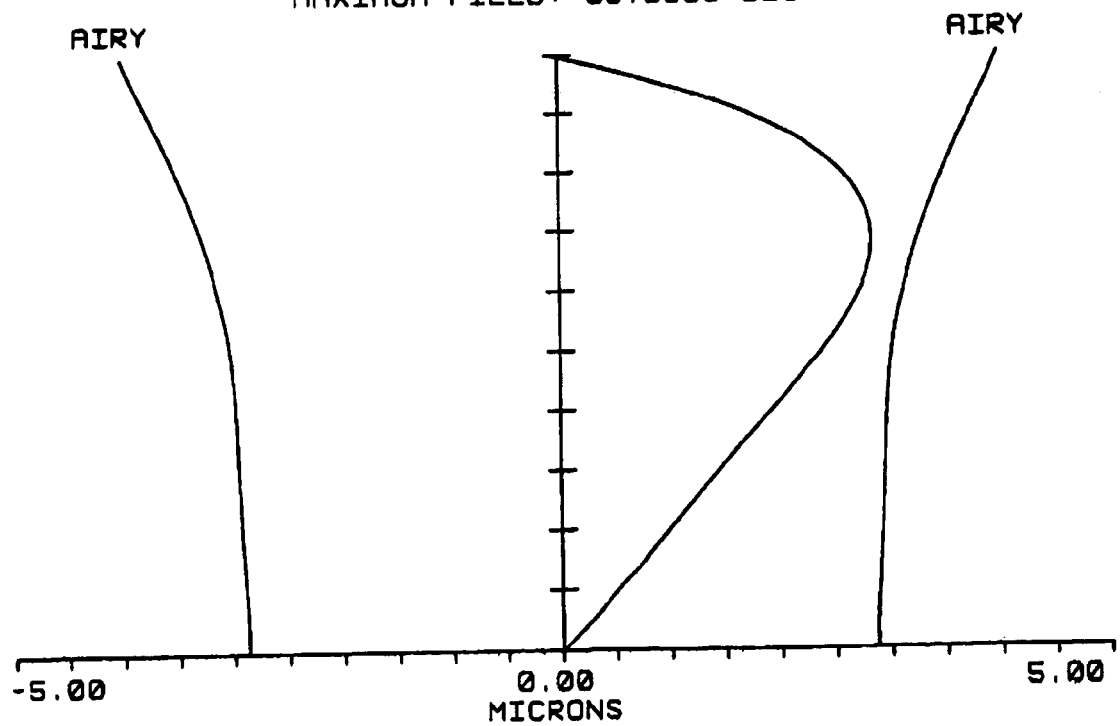
Figure 14A:
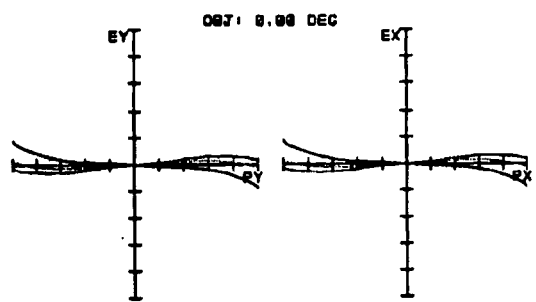
FIGS. 14-17 are graphs respectively showing transverse ray fan plots, field curvature and distortion, longitudinal spherical aberration, and lateral chromatic aberration curves for an image pick-up lens system in accordance with a fourth exemplary embodiment of the present invention.
Figure 14B:
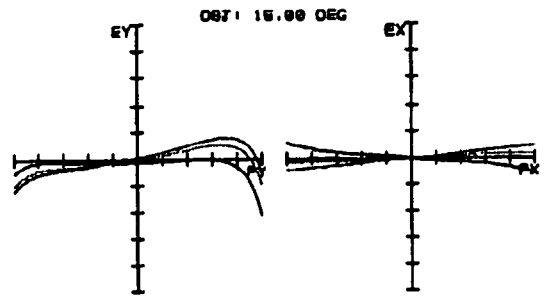
Figure 14C:
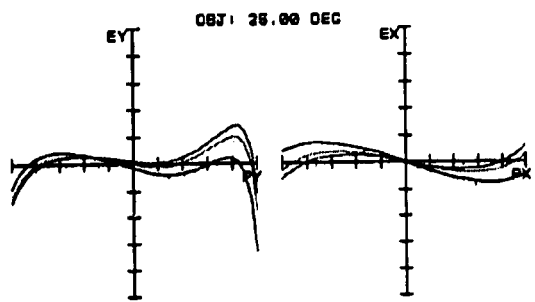
Figure 14D:
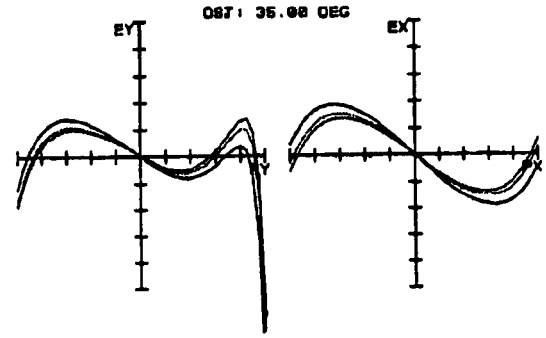

FIG. 1 shows a schematic configuration of an image pick-up lens system in accordance with the present invention. The system comprises an aperture stop 10, a biconvex first lens 20, and a meniscus-shaped second lens 30 having a concave surface on a side of an object. The aperture stop 10, the first lens 20 and the second lens 30 are aligned in that order from the object side to an image side. The first and the second lenses 20, 30 each have at least one aspheric surface. The first and second lenses 20, 30 can be made from a resin or a plastic, which makes their manufacture relatively easy and inexpensive.

The aperture stop 10 is arranged closest to the object in order to narrow down an incident angle of chief rays onto an image pick-up surface 40 located at the image side. In addition, this arrangement of the aperture stop 10 helps shorten a total length of the system. For further cost reduction, the aperture stop 10 is preferably formed directly on a first surface (not labeled) of the first lens 20 on the object side. In practice, a portion of the first surface of the first lens 20 through which light rays are not transmitted is coated with a black material, which functions as the aperture stop 10.

In order to provide compactness and excellent optical performance, the first and second lenses 20, 30 satisfy the following conditions:

$$1 < T/f < 1.62, \text{ and} \quad (1)$$

$$(2) 0.5 < f1/f < 0.9, \quad (2)$$

wherein, f1 is a focal length of the first lens 20, f is a focal length of the system, and T is a length from the aperture stop 10 to the image pick-up surface 40. The first condition (1) is for limiting the total length of the system. The second condition (2) is for correcting monochromatic aberrations, and providing both compactness and a desirable distribution of refracting power. In one aspect, when the ratio f1/f is above the lower limit of 0.5, the system provides satisfactory total refracting power and keeps high-order spherical aberration, high-order coma and lateral chromatic aberration of the system in a controlled range. In another aspect, when the ratio f1/f is below the upper limit of 0.9, the system is compact and provides satisfactory total refracting power.

The surfaces of the first and second lenses 20, 30 are appropriately aspheric, which enables this small number of lenses to satisfy many if not all of the above-described requirements of compactness, low cost, and excellent optical performance.

In addition, preferably, both the first surface and a second surface (not labeled) of the first lens 20 on the image side are aspheric, and the following conditions are satisfied:

$$0.2 < R2/R1 < 1, \text{ and} \quad (3)$$

$$1.2 < d/R2 < 2.1, \quad (4)$$

wherein, R1 is an absolute value of a radius of curvature of the first surface, R2 is an absolute value of a radius of curvature of the second surface, and d is a thickness of the first lens 20. The third condition (3) governs a distribution of refracting power for the first lens 20, in order to correct monochromatic aberrations. The fourth condition (4) is for lessening an incident angle of the second surface of the first lens 20, to further correct high-order aberrations.

The concave surface of the second lens 30 is defined as a third surface (not labeled). The first lens 20 and the second lens 30 satisfy the following condition:

$$0.5 < (1/R3)/(1/R1+1/R2+1/R4) < 1, \quad (5)$$

wherein, R3 is an absolute value of a radius of curvature of the third surface of the second lens 30, and R4 is an absolute value of a radius of curvature of a fourth surface (not labeled) of the second lens 30 on the image side.

The fifth condition (5) is for correcting field curvature and obtaining a flat field. In one aspect, when the ratio (1/R3)/(1/R1+1/R2+1/R4) is above the lower limit of 0.5, the negative Petzval's Sum produced by the third surface of the second lens 30 can compensate the total positive Petzval's Sum produced by the first and second surfaces of the first lens 20 and the fourth surface of the second lens 30. Thus, it is relatively easy to correct field curvature of the system. In another aspect, when the ratio (1/R3)/(1/R1+1/R2+1/R4) is below the upper limit of 1, the negative refracting power produced by the third surface of the second lens 30 can effectively compensate the positive coma and lateral chromatic aberration produced by the first lens 20. Meanwhile, the radius of curvature R3 of the third surface of the second lens 30 is not so small that increases the high-order aberrations of the system, and the negative refracting power provide by R3 can correct the lateral chromatic aberration of Lens 20. Furthermore, the radius of curvature R3 of the third surface of the second lens 30 has the smallest absolute value among the four absolute values of radiuses of curvature R1, R2, R3, R4 of the first and second lenses 20, 30. Thus in order to correct field curvature without producing high-order aberrations, the third surface of the second lens 30 is concave to the aperture stop 10.

Also, in order to appropriately correct the chromatic aberration of the system, the Abbe constant v1 of the first lens 20 and the Abbe constant v2 of the second lens 30 preferably satisfy the following condition:

$$v1 - v2 > 20. \quad (6)$$

Further, the fourth surface of the second lens 30 preferably has a gradually varying refraction from a central portion thereof near an optical axis of the system to a peripheral edge portion thereof. Thus, a central portion of the second lens 30 diverges light rays and a peripheral edge portion of the second lens 30 converges light rays, so that meridional/sagittal sections easily coincide. This feature further enhances the optical image performance in wide angles of the system.

The above explanations outline fundamental constituent features of the system of the present invention. Examples of the system will be described below with reference to FIGS. 2-29. It is to be understood that the invention is not limited to these examples. The following are symbols used in each exemplary embodiment.

T: length from the aperture stop to the image pick-up surface
f: total length of the system
FNo: F number
ω: half field angle
2ω: field angle
R: radius of curvature
d: distance between surfaces on the optical axis of the system
Nd: refractive index of lens
v: Abbe constant In each example, the first and second surfaces of the first lens 20 and the third and fourth surfaces of the second lens 30 are aspheric. The shape of each aspheric surface is provided by expression 1 below. Expression 1 is based on a Cartesian coordinate system, with the vertex of the surface being the origin, and the optical axis extending from the vertex being the x-axis.

Expression 1:

$$x = \frac{ch^2}{1 + \sqrt{1 - (k+1)c^2 h^2}} + \sum A_i h^i$$

wherein, h is a height from the optical axis to the surface, c is a vertex curvature, k is a conic constant, and $A_i$ are i-th order correction coefficients of the aspheric surfaces.

EXAMPLE 1

Tables 1 and 2 show lens data of Example 1.

TABLE 1

| f = 3.21 mm T = 4.00 mm FNo = 2.83 ω = 35° | | | | | |
|---|---|---|---|---|---|
| Surface No. | R (mm) | D (mm) | Nd | v | k |
| Stop 10 | infinite | −0.08 | | | 0 |
| 1st surface | 1.908685 | 1.949767 | 1.492 | 57.4 | 0.3969374 |
| 2nd surface | −1.386019 | 0.8410808 | | | 0.4322471 |
| 3rd surface | −0.6313817 | 0.9296156 | 1.585 | 29.9 | −0.6737203 |
| 4th surface | −1.140475 | 0.2679967 | | | −0.9677394 |

TABLE 2

| | Surface No. | | | |
|---|---|---|---|---|
| | 1st surface | 2nd surface | 3rd surface | 4th surface |
| Aspherical coefficient | A2 = 0 | A2 = 0 | A2 = 0 | A2 = 0 |
| | A4 = −0.037981674 | A4 = 0.040516016 | A4 = −0.04769116 | A4 = −0.0026459285 |
| | A6 = −0.11117147 | A6 = −0.0040262084 | A6 = 0.05474841 | A6 = 0.0088382976 |
| | A8 = 0.25717755 | A8 = −0.0022363842 | A8 = 0.018494473 | A8 = 0.0026971968 |
| | A10 = −0.44540332 | A10 = 0.0040769403 | A10 = −0.0063129926 | A10 = 0.00071976951 |
| | A12 = 0.1964647 | A12 = −0.0011660921 | A12 = −0.002450423 | A12 = −0.00036281554 |
| | A14 = 0 | A14 = 0 | A14 = 0 | A14 = 0 |
| | A16 = 0 | A16 = 0 | A16 = 0 | A16 = 0 |

FIGS. 2-5 are graphs of aberrations (transverse ray fan plots, field curvature/distortion, longitudinal spherical aberration, and lateral chromatic aberration) of the system of Example 1. FIGS. 2A-2D respectively show aberration curves of meridional/sagittal sections in 0°, 15°, 25° and 35° field angles. FIGS. 3A and 3B respectively show field curvature and distortion curves. The first lens 20 is made from polymethyl methacrylate (PMMA), and the second lens 30 is made from a polycarbonate.

EXAMPLE 2

Lens data of Example 2 are shown in tables 3 and 4.

TABLE 3 f = 3.19 mm T = 3.99 mm FNo = 2.80 ω = 35°

| Surface No. | R (mm) | D (mm) | Nd | ν | k |
|---|---|---|---|---|---|
| Stop 10 | infinite | −0.08 | | | 0 |
| 1st surface | 1.895722 | 1.934008 | 1.492 | 57.4 | −1.031395 |
| 2nd surface | −1.376186 | 0.8348153 | | | 0.441094 |
| 3rd surface | −0.6242678 | 0.9118045 | 1.585 | 29.9 | −0.673748 |
| 4th surface | −1.126245 | 0.3122 | | | −0.9667288 |

TABLE 4

| | Surface No. | | | |
|---|---|---|---|---|
| | 1st surface | 2nd surface | 3rd surface | 4th surface |
| Aspherical coefficient | A2 = 0 | A2 = 0 | A2 = 0 | A2 = 0 |
| | A4 = −0.0086994569 | A4 = 0.041163675 | A4 = −0.048693006 | A4 = −0.0027907875 |
| | A6 = −0.1161784 | A6 = −0.0042075403 | A6 = 0.057214163 | A6 = 0.0092363559 |
| | A8 = 0.27353815 | A8 = −0.002378654 | A8 = 0.019671017 | A8 = 0.0028687816 |
| | A10 = −0.48215993 | A10 = 0.0044133871 | A10 = −0.0068339682 | A10 = 0.00077916802 |
| | A12 = 0.21645868 | A12 = −0.0012847639 | A12 = −0.0026997998 | A12 = −0.00039973886 |
| | A14 = 0 | A14 = 0 | A14 = 0 | A14 = 0 |
| | A16 = 0 | A16 = 0 | A16 = 0 | A16 = 0 |

FIGS. 6-9 are graphs of aberrations (transverse ray fan plots, field curvature/distortion, longitudinal spherical aberration, and lateral chromatic aberration) of the system of Example 2. FIGS. 6A-6D respectively show aberrations curves of meridional/sagittal sections in 0°, 15°, 25° and 35° field angles. FIGS. 7A and 7B respectively show field curvature and distortion curves. The first lens 20 is made from polymethyl methacrylate (PMMA), and the second lens 30 is made from a polycarbonate.

EXAMPLE 3

Lens data of Example 3 are shown in tables 5 and 6. In the lens data shown below, E shows powers of 10; that is, for example, 2.5E-0.3 means $2.5 \times 10^{-3}$.

TABLE 5

| Surface No. | R (mm) | D (mm) | Nd | ν | k |
|---|---|---|---|---|---|
| Stop 10 | infinite | −0.0798 | | | 0 |
| 1st surface | 1.937576 | 1.951123 | 1.492 | 57.4 | −1.026366 |
| 2nd surface | −1.395695 | 0.842203 | | | 0.3649843 |
| 3rd surface | −0.6367427 | 0.9198735 | 1.585 | 29.9 | −0.6782141 |
| 4th surface | −1.111585 | 0.3119658 | | | −4.560295 |

$f = 3.21$ mm $T = 4.05$ mm $FNo = 2.83$ $\omega = 35°$

TABLE 6

| | Surface No. | | | |
|---|---|---|---|---|
| | 1st surface | 2nd surface | 3rd surface | 4th surface |
| Aspherical coefficient | A2 = 0<br>A4 = −0.0090154464<br>A6 = −0.027257396<br>A8 = −0.31450985<br>A10 = 0.60707428<br>A12 = 0<br>A14 = 0<br>A16 = 0 | A2 = 0<br>A4 = 0.047546265<br>A6 = −0.067428703<br>A8 = 0.088613357<br>A10 = −0.04786747<br>A12 = 0<br>A14 = 0<br>A16 = 0 | A2 = 0<br>A4 = −0.067457258<br>A6 = 0.048702325<br>A8 = −0.0016956663<br>A10 = −8.414046E-005<br>A12 = 0<br>A14 = 0<br>A16 = 0 | A2 = 0<br>A4 = −0.17525752<br>A6 = 0.053841628<br>A8 = 0.0007158852<br>A10 = −0.001238689<br>A12 = 0<br>A14 = 0<br>A16 = 0 |

FIGS. 10-13 are graphs of aberrations (transverse ray fan plots, field curvature/distortion, longitudinal spherical aberration, and lateral chromatic aberration) of the system of Example 3. FIGS. 10A-10D respectively show aberrations curves of meridional/sagittal sections in 0°, 15°, 25° and 35° field angles. FIGS. 11A and 11B respectively show field curvature and distortion curves. The first lens 20 is made from polymethyl methacrylate (PMMA), and the second lens 30 is made from a polycarbonate.

EXAMPLE 4

Lens data of Example 4 are shown in tables 7 and 8. In the lens data shown below, E shows powers of 10.

TABLE 7

| Surface No. | R (mm) | D (mm) | Nd | ν | k |
|---|---|---|---|---|---|
| Stop 10 | infinite | −0.067878 | | | 0 |
| 1st surface | 2.124272 | 1.991005 | 1.492 | 57.4 | −12.41067 |
| 2nd surface | −1.327932 | 0.7080908 | | | −0.1739528 |
| 3rd surface | −0.6807691 | 0.6568542 | 1.585 | 29.9 | −0.9940377 |
| 4th surface | −1.337036 | 0.861976 | | | −3.860014 |

$f = 3.26$ mm $T = 4.22$ mm $FNo = 2.80$ $\omega = 35°$

FIGS. 14-17 are graphs of aberrations (transverse ray fan plots, field curvature/distortion, longitudinal spherical aber-

TABLE 8

Figure 15A:
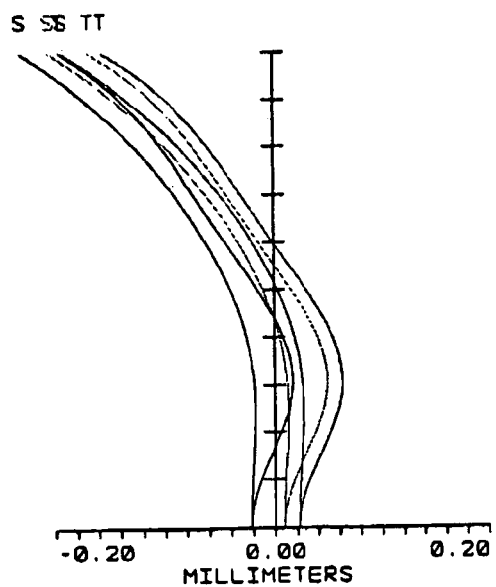
Figure 15B:
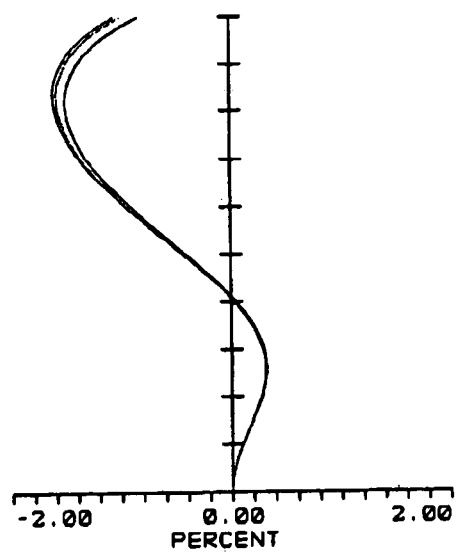
Figure 16:
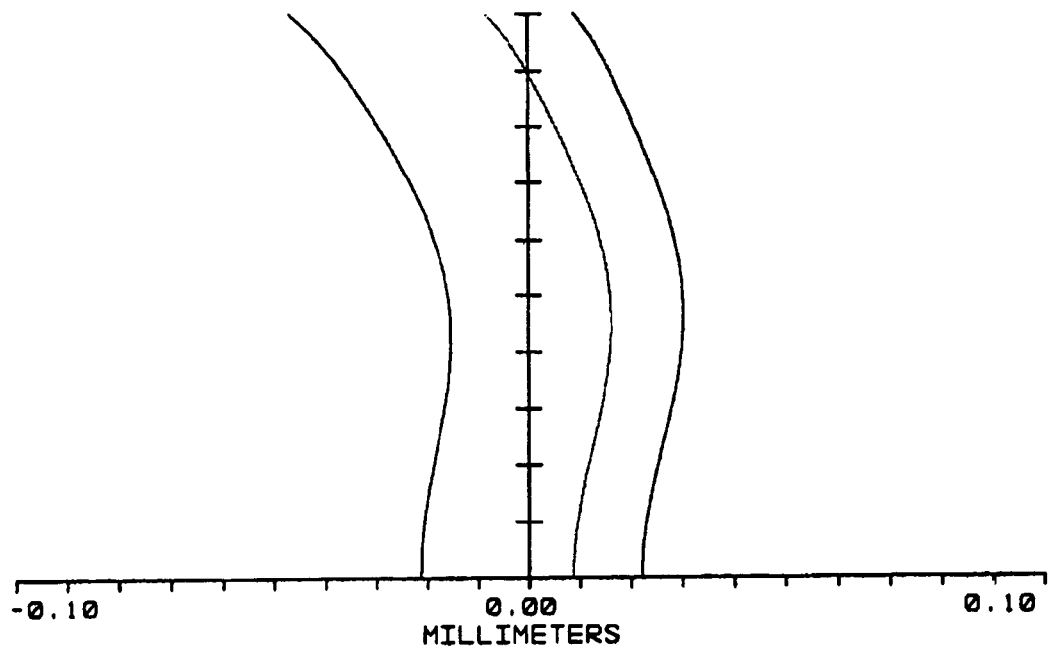
Figure 17:
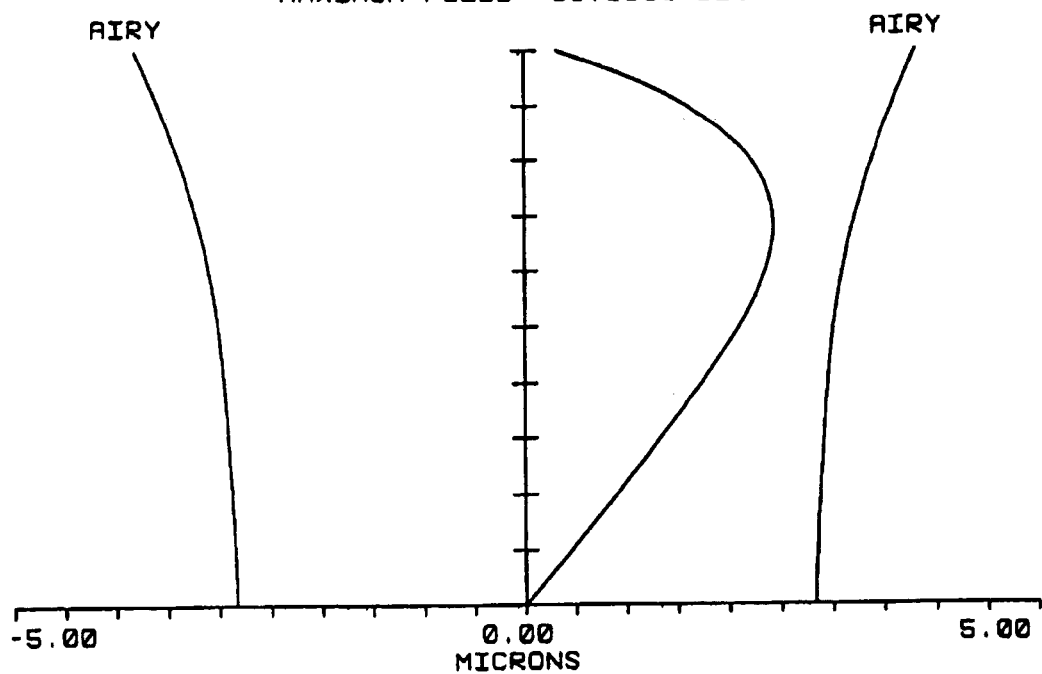
Figure 18A:
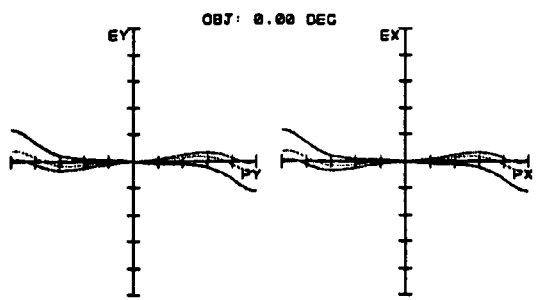
FIGS. 18-21 are graphs respectively showing transverse ray fan plots, field curvature and distortion, longitudinal spherical aberration, and lateral chromatic aberration curves for an image pick-up lens system in accordance with a fifth exemplary embodiment of the present invention.
Figure 18B:
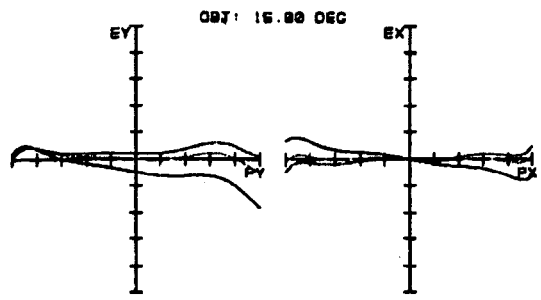
Figure 18C:
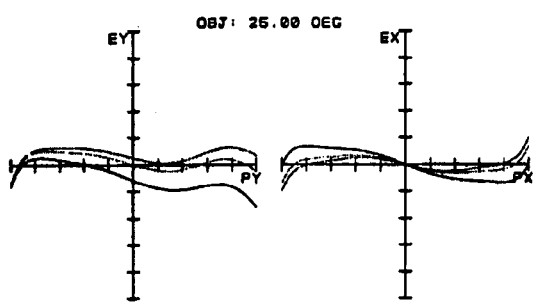
Figure 18D:
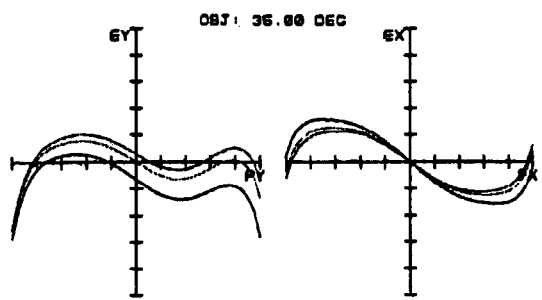
Figure 19A:
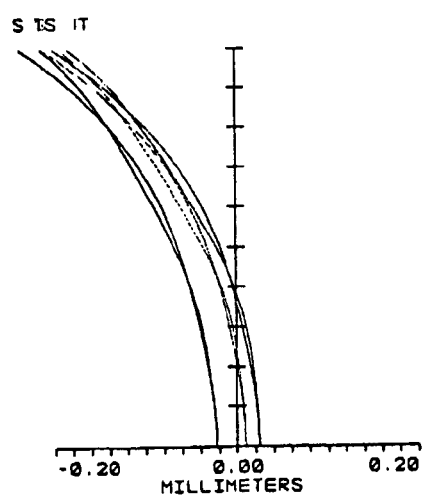
Figure 19B:
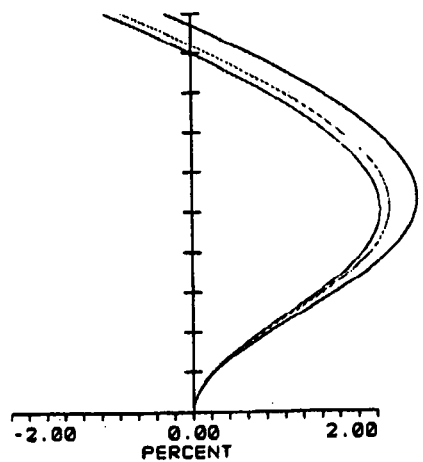
Figure 20:
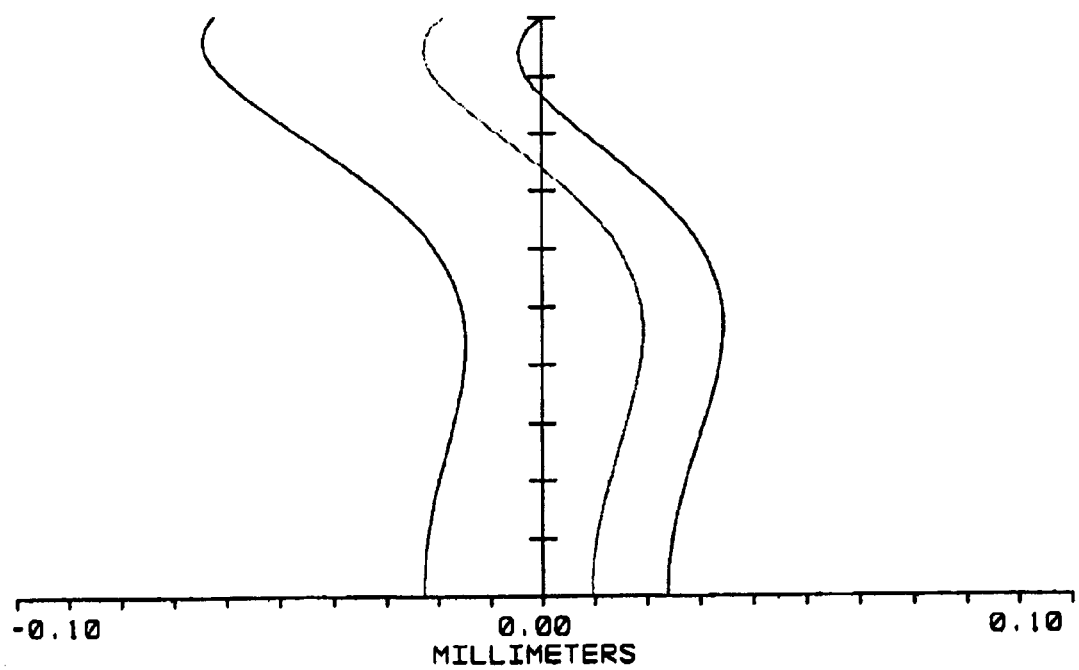
Figure 21:
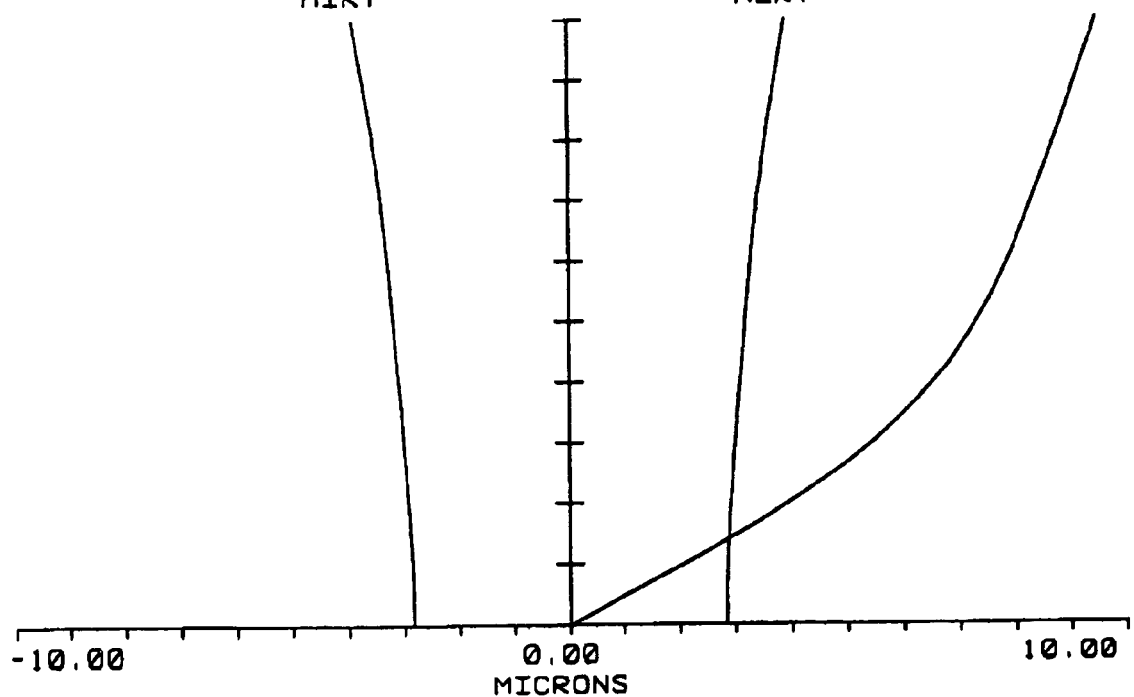
Figure 22A:
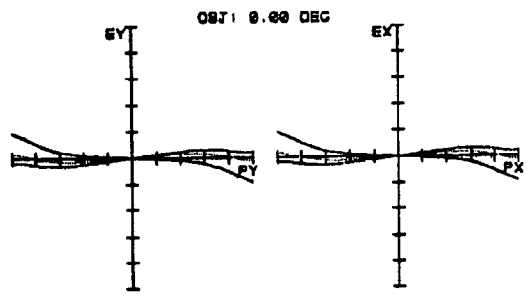
FIGS. 22-25 are graphs respectively showing transverse ray fan plots, field curvature and distortion, longitudinal spherical aberration, and lateral chromatic aberration curves for an image pick-up lens system in accordance with a sixth exemplary embodiment of the present invention.
Figure 22B:
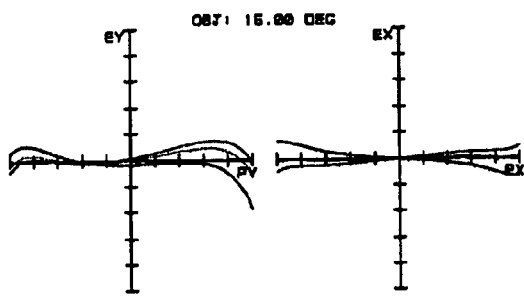
Figure 22C:
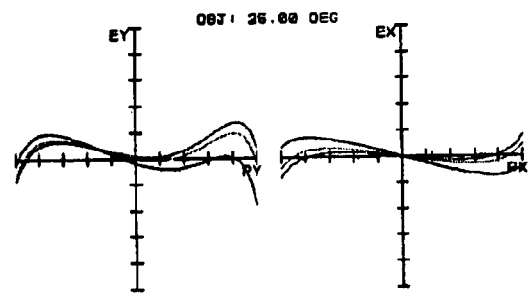
Figure 22D:
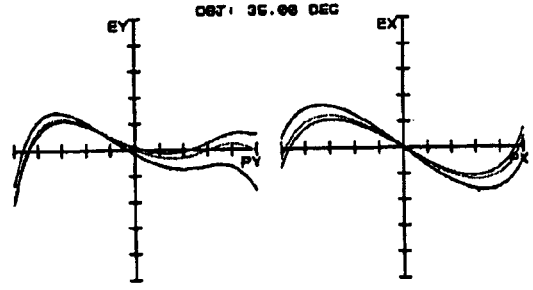
Figure 23A:
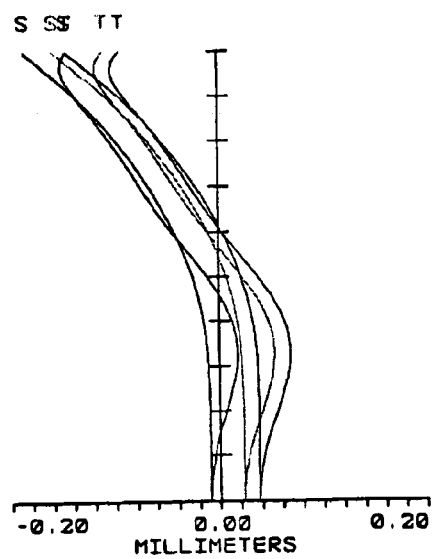
Figure 23B:
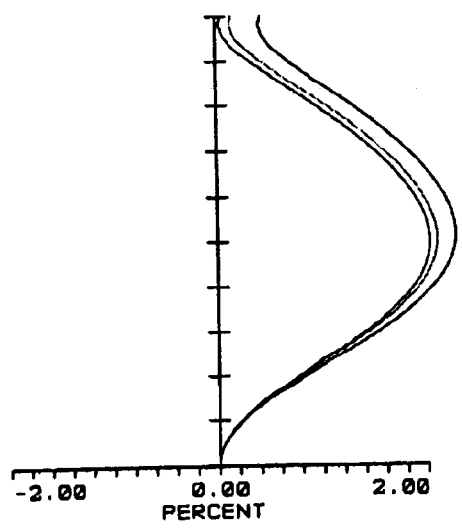
Figure 24:
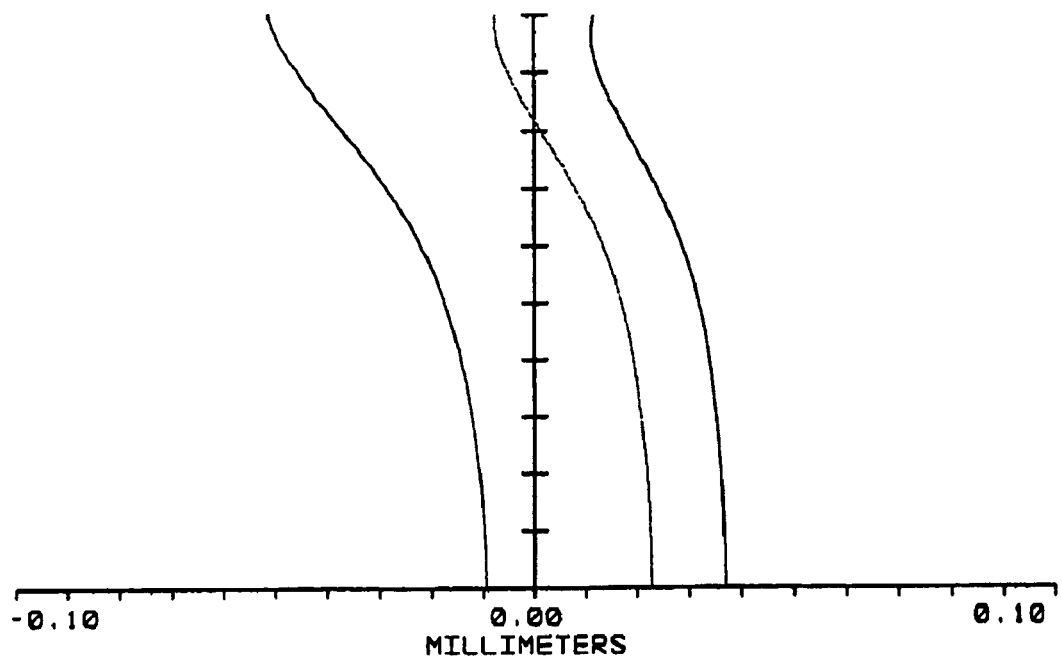
Figure 25:
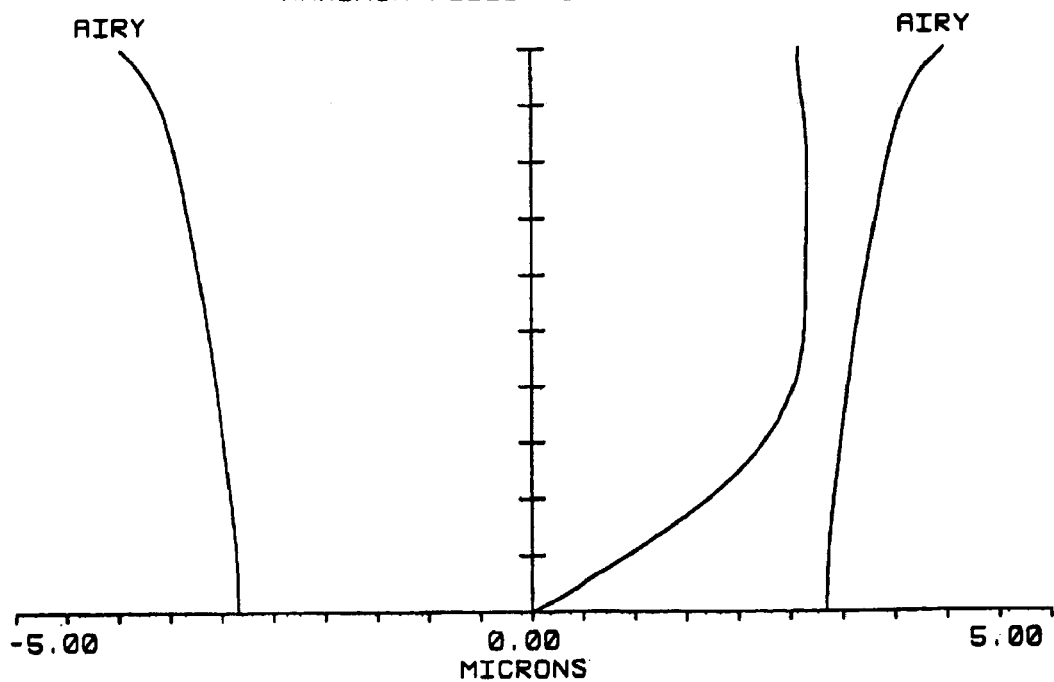
Figure 26A:
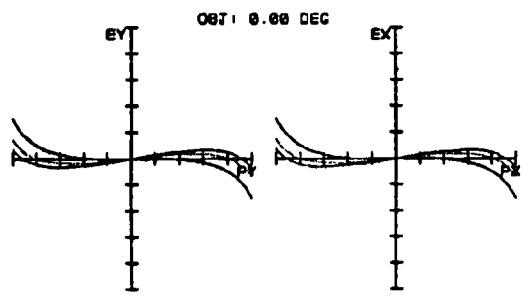
FIGS. 26-29 are graphs respectively showing transverse ray fan plots, field curvature and distortion, longitudinal spherical aberration, and lateral chromatic aberration curves for an image pick-up lens system in accordance with a seventh exemplary embodiment of the present invention.
Figure 26B:
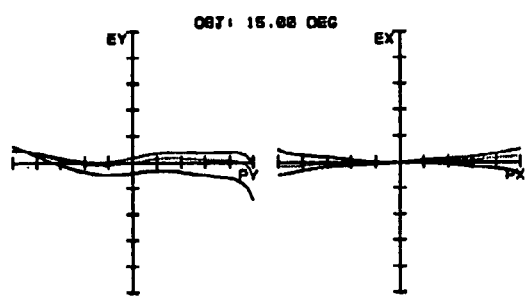
Figure 26C:
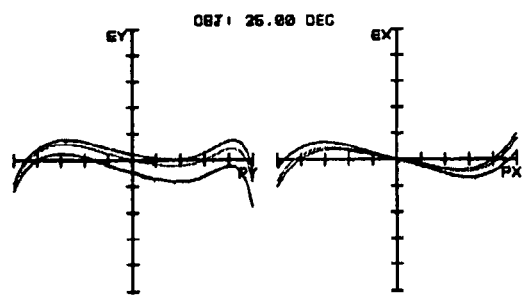
Figure 26D:
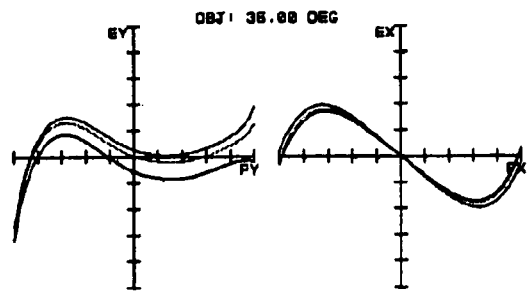
Figure 27A:
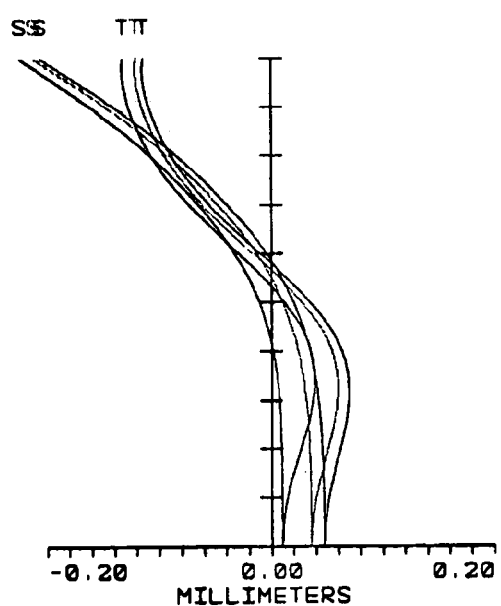
Figure 27B:
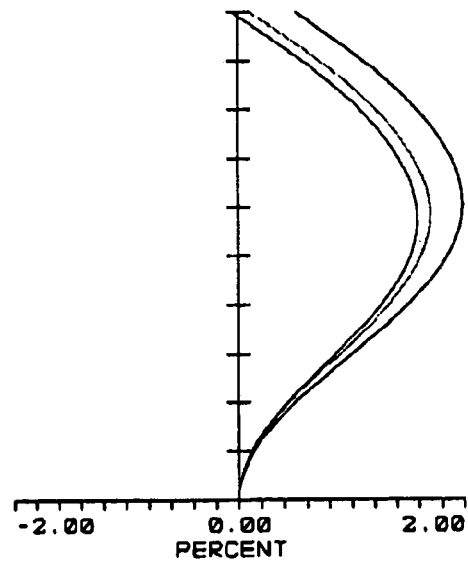
Figure 28:
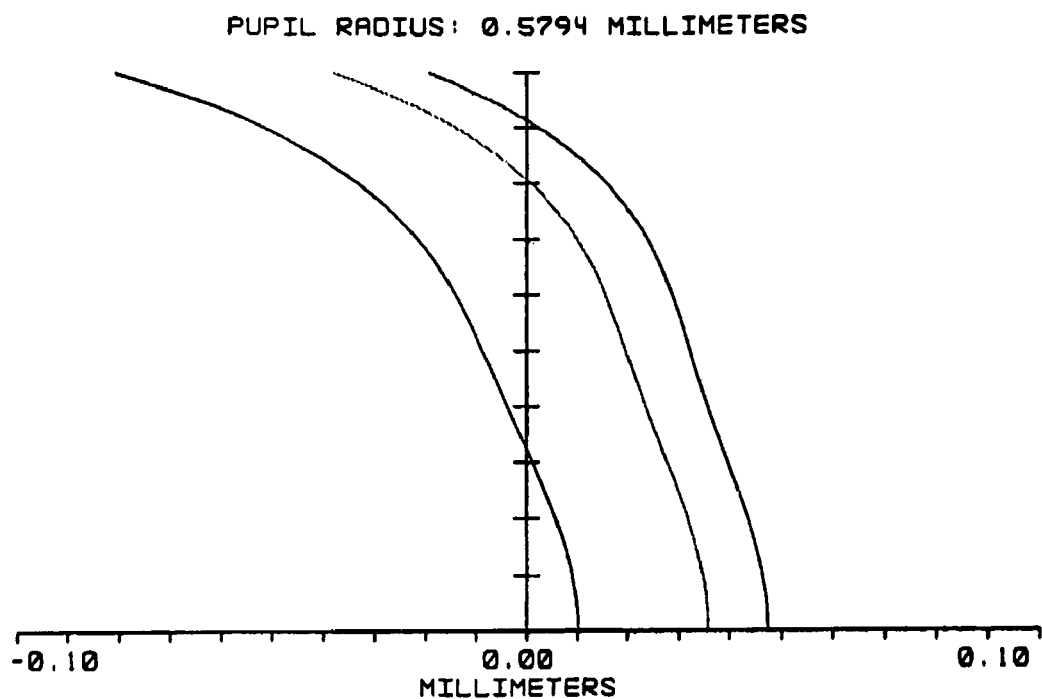
Figure 29:
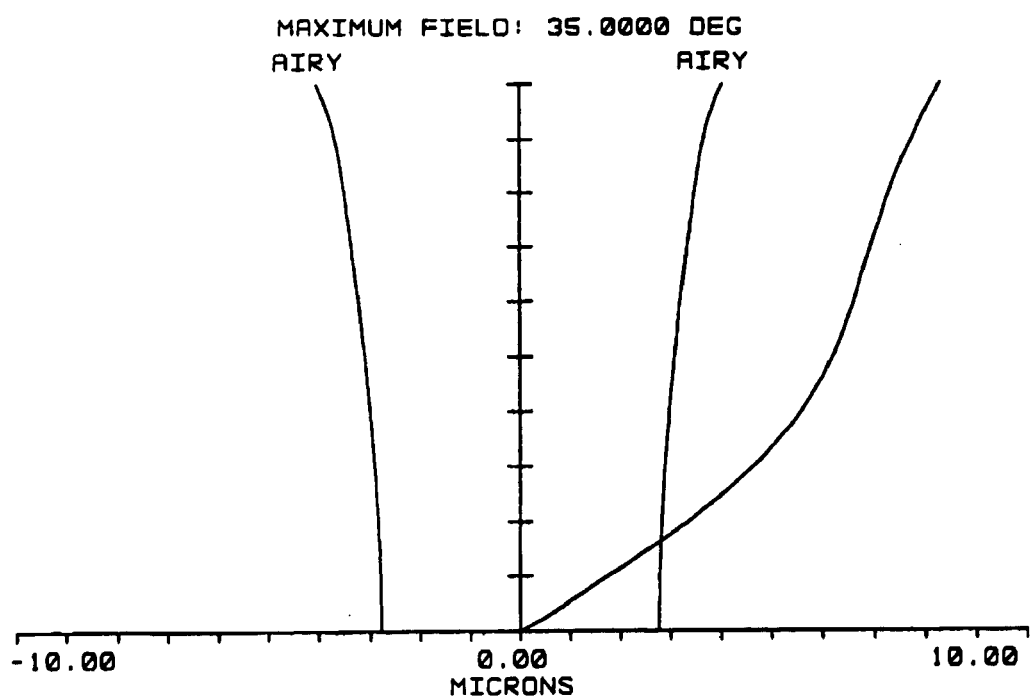
Figure 30:
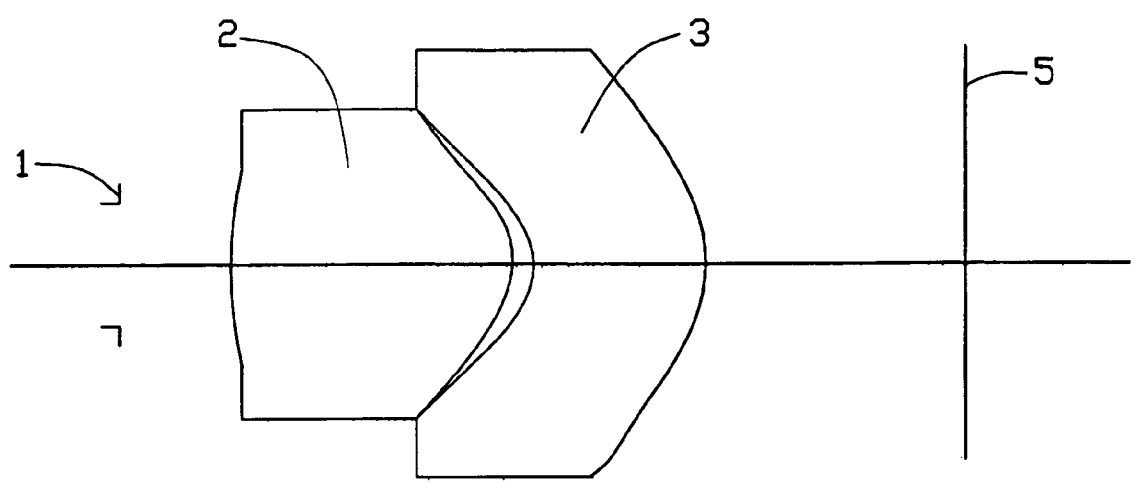
FIG. 30 is a schematic representation of an image pick-up lens in accordance with a prior publication.

| | Surface No. | | | |
|---|---|---|---|---|
| | 1st surface | 2nd surface | 3rd surface | 4th surface |
| Aspherical coefficient | A2 = 0<br>A4 = 0.10925473<br>A6 = −0.13095248<br>A8 = 0<br>A10 = 0<br>A12 = 0<br>A14 = 0<br>A16 = 0 | A2 = 0<br>A4 = 0.011162728<br>A6 = −0.066705593<br>A8 = 0.068492417<br>A10 = −0.04357828<br>A12 = 0<br>A14 = 0<br>A16 = 0 | A2 = 0<br>A4 = −0.22040448<br>A6 = 0.019200829<br>A8 = −0.023114479<br>A10 = −9.0582917E-005<br>A12 = 0<br>A14 = 0<br>A16 = 0 | A2 = 0<br>A4 = −0.14881856<br>A6 = 0.051775666<br>A8 = 0.0011871839<br>A10 = −0.0013271067<br>A12 = 0<br>A14 = 0<br>A16 = 0 | ration, and lateral chromatic aberration) of the system of Example 4. FIGS. 14A-14D respectively show aberrations curves of meridional/sagittal sections in 0°, 15°, 25° and 35° field angles. FIGS. 15A and 15B respectively show field curvature and distortion curves. The first lens 20 is made from polymethyl methacrylate (PMMA), and the second lens 30 is made from a polycarbonate.

EXAMPLE 5

Lens data of Example 5 are shown in tables 9 and 10.

TABLE 9

| $f = 3.22$ mm $T = 4.99$ mm $FNo = 2.80$ $\omega = 35°$ | | | | | |
|---|---|---|---|---|---|
| Surface No. | R (mm) | D (mm) | Nd | ν | k |
| Stop 10 | infinite | −0.03 | | | 0 |
| 1st surface | 3.567241 | 2.042576 | 1.492 | 57.4 | −0.9115067 |
| 2nd surface | −1.204826 | 0.8256124 | | | −0.1979544 |
| 3rd surface | −0.5674448 | 0.8186415 | 1.585 | 29.9 | −0.9227495 |
| 4th surface | −0.8538844 | | | | −1.068108 |

TABLE 10

| | Surface No. | | | |
|---|---|---|---|---|
| | 1st surface | 2nd surface | 3rd surface | 4th surface |
| Aspherical coefficient | $A2 = 0$ | $A2 = 0$ | $A2 = 0$ | $A2 = 0$ |
| | $A4 = -0.038187626$ | $A4 = 0.046356766$ | $A4 = 0.040616649$ | $A4 = 0.0185752$ |
| | $A6 = 0.025227628$ | $A6 = -0.0032353324$ | $A6 = 0.085273579$ | $A6 = 0.0030064393$ |
| | $A8 = 0.05774558$ | $A8 = -0.0028835816$ | $A8 = -0.079657862$ | $A8 = 0.002911957$ |
| | $A10 = -0.44540332$ | $A10 = 0.0019185201$ | $A10 = 0.050834821$ | $A10 = 0.00065240269$ |
| | $A12 = 0.1964647$ | $A12 = 0.00024573464$ | $A12 = -0.016829857$ | $A12 = -0.00033965939$ |
| | $A14 = 0$ | $A14 = 0$ | $A14 = 0$ | $A14 = 0$ |
| | $A16 = 0$ | $A16 = 0$ | $A16 = 0$ | $A16 = 0$ |

FIGS. 18-21 are graphs of aberrations (transverse ray fan plots, field curvature/distortion, longitudinal spherical aberration, and lateral chromatic aberration) of the system of Example 5. FIGS. 18A-18D respectively show aberrations curves of meridional/sagittal sections in 0°, 15°, 25° and 35° field angles. FIGS. 19A and 19B respectively show field curvature and distortion curves. The first lens 20 is made from polymethyl methacrylate (PMMA), and the second lens 30 is made from a polycarbonate.

EXAMPLE 6

Lens data of Example 6 are shown in tables 11 and 12.

TABLE 11

| $f = 3.19$ mm $T = 4.32$ mm $FNo = 2.8$ $\omega = 35°$ | | | | | |
|---|---|---|---|---|---|
| Surface No. | R (mm) | D (mm) | Nd | ν | k |
| Stop 10 | infinite | −0.05 | | | 0 |
| 1st surface | 2.704951 | 1.934008 | 1.531 | 56.0 | −19.70274 |
| 2nd surface | −1.264784 | 0.8348153 | | | −0.3060202 |
| 3rd surface | −0.60228 | 0.9118045 | 1.585 | 29.9 | −0.9132682 |
| 4th surface | −1.056885 | 0.640254 | | | −2.01608 |

TABLE 12

| | Surface No. | | | |
|---|---|---|---|---|
| | 1st surface | 2nd surface | 3rd surface | 4th surface |
| Aspherical coefficient | $A2 = 0$ | $A2 = 0$ | $A2 = 0$ | $A2 = 0$ |
| | $A4 = 0.078640248$ | $A4 = 0.043790817$ | $A4 = 0.086709045$ | $A4 = 0.028145024$ |
| | $A6 = -0.1986909$ | $A6 = -0.092545745$ | $A6 = 0.049096719$ | $A6 = -0.00012293722$ |
| | $A8 = 0.27353815$ | $A8 = 0.12998134$ | $A8 = -0.10131265$ | $A8 = -0.0034547048$ |
| | $A10 = -0.48215993$ | $A10 = -0.11896713$ | $A10 = -0.14111931$ | $A10 = -0.00054609844$ |
| | $A12 = 0.21645868$ | $A12 = 0.038733469$ | $A12 = 0.13145728$ | $A12 = 0.00054942201$ |
| | $A14 = 0$ | $A14 = 0$ | $A14 = 0$ | $A14 = 0$ |
| | $A16 = 0$ | $A16 = 0$ | $A16 = 0$ | $A16 = 0$ |

FIGS. 22-25 are graphs of aberrations (transverse ray fan plots, field curvature/distortion, longitudinal spherical aberration, and lateral chromatic aberration) of the system of Example 6. FIGS. 22A-22D respectively show aberrations curves of meridional/sagittal sections in 0°, 15°, 25° and 35° field angles. FIGS. 23A and 23B respectively show field curvature and distortion curves. The first lens 20 is made from a cyclo-olefin polymer, and the second lens 30 is made from a polycarbonate.

EXAMPLE 7

Lens data of Example 7 are shown in tables 13 and 14.

TABLE 13 f = 3.19 mm T = 5.12 mm FNo = 2.73 ω = 35°

| Surface No. | R (mm) | D (mm) | Nd | ν | k |
|---|---|---|---|---|---|
| Stop 10 | infinite | −0.04 | | | 0 |
| 1st surface | 3.73331 | 1.934008 | 1.531 | 56.0 | 7.649853 |
| 2nd surface | −0.9675068 | 0.3958819 | | | −0.5408035 |
| 3rd surface | −0.5563445 | 0.9118045 | 1.585 | 29.9 | −0.7896022 |
| 4th surface | −1.039531 | | | | −1.222231 |

TABLE 14

| | Surface No. | | | |
|---|---|---|---|---|
| | 1st surface | 2nd surface | 3rd surface | 4th surface |
| Aspherical coefficient | A2 = 0 | A2 = 0 | A2 = 0 | A2 = 0 |
| | A4 = −0.036296997 | A4 = 0.1129865 | A4 = 0.31675922 | A4 = 0.021944232 |
| | A6 = −0.14080751 | A6 = −0.084130154 | A6 = 0.1861908 | A6 = 0.0334663164 |
| | A8 = 0.27353815 | A8 = 0.12343708 | A8 = −0.20723569 | A8 = −0.0087931231 |
| | A10 = −0.48215993 | A10 = −0.11896713 | A10 = 0.0707272 | A10 = −0.002238773 |
| | A12 = 0.21645868 | A12 = 0.038733447 | A12 = 0.032847897 | A12 = 0.001090651 |
| | A14 = 0 | A14 = 0 | A14 = 0 | A14 = 0 |
| | A16 = 0 | A16 = 0 | A16 = 0 | A16 = 0 |

FIGS. 26-29 are graphs of aberrations (transverse ray fan plots, field curvature/distortion, longitudinal spherical aberration, and lateral chromatic aberration) of the system of Example 7. FIGS. 26A-26D respectively show aberrations curves of meridional/sagittal sections in 0°, 15°, 25° and 35° field angles. FIGS. 27A and 27B respectively show field curvature and distortion curves. The first lens 20 is made from a cyclo-olefin polymer, and the second lens 30 is made from a polycarbonate.

Table 15 compares focal lengths and other parameters across Examples 1 through 7.

TABLE 15

| | Example | | | | | | |
|---|---|---|---|---|---|---|---|
| | 1 | 2 | 3 | 4 | 5 | 6 | 7 |
| FNo | 2.83 | 2.8 | 2.83 | 2.8 | 2.8 | 2.8 | 2.73 |
| 2ω (°) | 70 | 70 | 70 | 70 | 70 | 70 | 70 |
| T (mm) | 4 | 3.99 | 4.05 | 4.22 | 4.99 | 4.32 | 5.12 |
| f (mm) | 3.21 | 3.19 | 3.21 | 3.26 | 3.22 | 3.19 | 3.19 |
| T/f | 1.25 | 1.24 | 1.26 | 1.29 | 1.55 | 1.35 | 1.61 |
| f1/f | 0.63 | 0.63 | 0.62 | 0.63 | 0.66 | 0.61 | 0.53 |
| R2/R1 | 0.73 | 0.73 | 0.72 | 0.62 | 0.34 | 0.47 | 0.26 |
| d/R2 | 1.4 | 1.41 | 1.4 | 1.49 | 1.69 | 1.53 | 1.99 |

TABLE 15-continued

| | Example | | | | | | |
|---|---|---|---|---|---|---|---|
| | 1 | 2 | 3 | 4 | 5 | 6 | 7 |
| (1/R3)/(1/R1 + 1/R2 + 1/R4) | 0.75 | 0.75 | 0.74 | 0.75 | 0.77 | 0.79 | 0.79 |
| ν1-ν2 | 27.5 | 27.5 | 27.5 | 27.5 | 27.5 | 26.1 | 26.1 |

As seen in the above-described examples, the present invention provides a low-cost image pick-up lens system with a field angle of at least 70°. The total length of the system is small, and the system appropriately corrects fundamental aberrations.

It is to be understood that the invention may be embodied in other forms without departing from the spirit thereof. Thus, the described exemplary embodiments are to be considered in all respects as illustrative and not restrictive, and the invention is not to be limited to the details given herein.

What is claimed is:

1. An image pick-up lens system comprising:
   an aperture stop;
   a biconvex first lens; and
   a meniscus-shaped second lens having a concave surface on a side of an object;

wherein the aperture stop, the first lens and the second lens are aligned in that order from the object side to an image side, the first lens is aspheric on both convex surfaces thereof, the second lens has at least one aspheric surface, and the following conditions are satisfied;

$$0.6 < f1/f < 0.7, \quad (1)$$

$$1 < T/f < 1.56, \quad (2)$$

$$0.45 < R2/R1 < 1; \text{ and} \quad (3)$$

$$1.2 < d/R2 < 2.1, \quad (4)$$

wherein f1 is a focal length of the first lens, f is a focal length of the system, T is a length from the aperture stop to an image pick-up surface of the image side, R1 is an absolute value of a radius of curvature of the first lens on the object side, R2 is an absolute value of a radius of curvature of the first lens on the image side, and d is a thickness of the first lens.

2. The image pick-up lens system in accordance with claim 1, wherein the second lens is aspheric on both surfaces and the following condition is satisfied;

$$0.5 < (1/R3)/(1/R1+1/R2+1/R4) < 1, \quad (5)$$

where R3 is an absolute value of a radius of curvature of the second lens on the object side, and R4 is an absolute value of a radius of curvature of the second lens on the image side.

3. The image pick-up lens system in accordance with claim 1, wherein the following condition is satisfied:

$$v1-v2 < 20, \quad (6)$$

where ν1 is the Abbe constant of the first lens, and ν2 is the Abbe constant of the second lens.

4. The image pick-up lens system in accordance with claim 1, wherein the first and second lenses are made from a resin or a plastic material respectively.

5. The image pick-up lens system in accordance with claim 4, wherein the first and second lenses are made from materials selected from polymethyl methacrylate, a polycarbonate, and a cyclo-olefin polymer.

6. The image pick-up lens system in accordance with claim 1, wherein the aperture stop is formed on the first lens.

* * * * *